United States Patent [19]

DeAndrea

[11] Patent Number: 5,075,794
[45] Date of Patent: Dec. 24, 1991

[54] REFLECTIVE OPITICAL FEEDBACK ELEMENT

[75] Inventor: John J. DeAndrea, Monmouth Junction, N.J.

[73] Assignee: AMP Incorporated, Harrisburg, Pa.

[21] Appl. No.: 613,322

[22] Filed: Nov. 15, 1990

[51] Int. Cl.$^5$ ............................................. H04B 10/00
[52] U.S. Cl. .................................................. 359/194
[58] Field of Search ............... 455/606, 607, 617, 619; 250/370.14, 214 C; 330/308, 59

[56] References Cited

U.S. PATENT DOCUMENTS

| | | | |
|---|---|---|---|
| 3,611,173 | 10/1971 | Lafayette et al. | 330/59 |
| 3,955,149 | 5/1976 | Trilling | 330/300 |
| 3,972,004 | 7/1976 | Libs | 330/59 |
| 4,284,960 | 8/1981 | Ryan | 330/300 |
| 4,625,105 | 11/1986 | Hentschel | 250/205 |
| 4,744,105 | 5/1988 | Kasper | 455/619 |

FOREIGN PATENT DOCUMENTS 2218431 10/1973 Fed. Rep. of Germany .
2030020 3/1960 United Kingdom ................ 359/308

OTHER PUBLICATIONS

Considerations for Optical Receiver Design, IEEE Journal on Selected Areas in Communications vol. SAC-1, No. 3, 4/83, pp. 524–532.

Primary Examiner—Reinhard J. Eisenzopf
Assistant Examiner—L. Pascal

[57] ABSTRACT

A device for providing an optical feedback path for a receiver comprises a header including a base having a major surface and first, second and third leads. The first and second leads extend through the base to form first and second posts on the major surface of the base and the third lead is electrically connected to the base. The portion of the first and second leads extending through the base are surrounded by electrical insulation so that the first and second leads are electrically insulated from the base. A submount comprising a flat insulating block with a layer of gold on its top and bottom surfaces is solder-bonded to the major surface of the base and the gold layer on the top surface of the submount is wire-bonded to the base. An LED is solder-bonded to the top surface of the submount and wire-bonded to the first post on the major surface of the base, the LED emitting optical radiation when it is forward biased. A P-I-N diode is also solder-bonded to the top surface submount and wire-bonded to the second post on the major surface of the base of the header. The P-I-N diode detects the optical radiation emitted by the LED. In order to insure that the light emitted by the LED is detected by the P-I-N diode as is required to establish a feedback path for a receiver, the standard header cover with a glass window is utilized. However, to form an optically reflecting surface, the interior surface of the glass window is illustratively metallized by platinum sputtering followed by gold plating.

10 Claims, 2 Drawing Sheets

REFLECTIVE OPITICAL FEEDBACK ELEMENT

FIELD OF THE INVENTION

The present invention relates to a light emitting diode and a light detecting photodiode integrated into a single package. The integrated package is especially useful for implementing a receiver which utilizes optical feedback.

BACKGROUND OF THE INVENTION

Receivers for optical signals are useful in a wide variety of applications including optical communication systems. As presently contemplated, such systems typically have a light source and receiver optically coupled to each other by means of an optical fiber pathway. Information is usually transmitted by varying the intensity of optical radiation and the rate of variation is referred to as the bit rate. An optical receiver detects an incoming optical signal and converts it to an electrical signal.

The optical receiver should have a high sensitivity. The optical receiver should also have a large dynamic range. Additionally, typical optical communications systems operate within a wide range of bit rates. A common approach for achieving medium sensitivity and wide bandwidth for an optical receiver is to use a transimpedance amplifier. (See, e.g., Ogawa, "Considerations For Optical Receiver Design" IEEE Journal on Selected Areas in Communications", VOL SAC-1, No. 3, Apr. 1983, pp. 524–532). This type of receiver comprises an amplifier having non-inverting and inverting inputs and an output. The non-inverting input of the amplifier is grounded. A signal photodetector for receiving the incoming optical signal is connected to the inverting input. A resistor provides electrical feedback between the output and the inverting input to balance the current produced by the signal photodetector. With this configuration, the feedback resistor must be large to produce high gain and sensitivity.

Such a large resistor causes several problems. In particular, the dynamic range of the receiver is limited because large amplifier output voltage swings are needed for an appreciable signal current flow through the feedback resistor. Additionally, the bandwidth is limited by input capacitance combining with parasitic feedback resistor capacitance producing a large RC time constant.

A receiver utilizing optical feedback between the amplifier output and the amplifier input eliminates many of the problems associated with the feedback resistor in a transimpedance amplifier while providing the necessary current feedback to achieve wide dynamic range and wide bandwidth. Thus, the feedback resistor is replaced by an optical feedback path. To achieve the optical feedback path, a light source such as an LED is connected to the output of the amplifier. Connected to the non-inverting input of the amplifier is a feedback photodetector illustratively in the form of a P-I-N photodiode. In addition there is an optical path between the light source and feedback photodetector. During receiver operation, negative feedback as a result of optical transmission between the light source at the amplifier output and the feedback photodetector insures that the optical level at the feedback detector is large enough so that the photo-current in the feedback detector balances the photo-current in the signal detector.

The use of optical feedback has a number of significant advantages. The optical feedback coupling eliminates the feedback resistor as a noise source and the parasitic capacitance as a bandwidth limitation. This results in a higher signal-to-noise ratio, and thus a more sensitive device for optical communications. It also insures that the amplifier output voltage swing is small resulting in a wide dynamic range.

Thus, the use of optical feedback in an optical receiver provides significant advantages over the use of a feedback resistor.

Presently, receivers using optical feedback are implemented with discrete light emitting and photodetecting components in the feedback path (see, e.g., U.S. Pat. No. 4,744,105; U.S. Pat. No. 3,955,149; U.S. Pat. No. 4,284,960; U.S. Pat. No. 4,625,105: U.S. Pat. No. 3,611,173; UK Patent Application 2,030,020A and German Patent Document 2, 218,431).

In contrast to the use of discrete components to implement a light source and photodetector to provide a feedback path for a receiver, it is an object of the present invention to provide a single integrated package including a light emitting device and a detector for use in providing an optical feedback path for a receiver. It is a further object of the invention to provide a single integrated package wherein a light emitting diode and photodetector are bonded to a common submount of a header and wherein the optical medium for coupling light from the LED to the photodetector is a reflective surface mounted above the submount.

SUMMARY OF THE INVENTION

In accordance with an illustrative embodiment of the present invention, a device for providing an optical feedback path for a receiver comprises a header including a base having a major surface and first, second, and third leads. The first and second leads extend through the base to form first and second posts on the major surface of the base and the third lead is electrically connected to the base. The portions of the first and second leads extending through the base are surrounded by electrically insulating material so that the first and second leads are electrically insulated from the base.

A submount comprising a flat insulating block with a layer of gold on its top and bottom surfaces is solder-bonded to the major surface of the base and the gold layer on the top surface of the submount is wire-bonded to the base. A light emitting device such as an LED is solder-bonded to the top surface of the submount and wire-bonded to the first post on the major surface of the base, the LED emitting optical radiation when it is forward biased. A light detecting device such as a P-I-N diode is also solder-mounted to the top surface of the submount and wire-bonded to the second post on the major surface of the base of the header. The P-I-N diode detects the optical radiation emitted by the LED.

In order to insure that the light emitted by the LED is detected by the P-I-N diode as is required to establish a feedback path for a receiver, a standard cylindrically shaped header cover whose top surface is formed by a glass window is utilized. However, to form an optically reflecting surface, the interior surface of the glass window is metallized with titanium, platinum and then with a gold layer using standard deposition techniques. Alternatively, a metal or plastic header cover can be utilized.

In operation in a receiver, the base of the header is positively biased by connecting the third lead to a positive electrical potential. The LED is connected to the output of the amplifier via the first lead and a resistor. The P-I-N diode is connected by the second lead to the inverting input of the amplifier. Light generated by the LED in response to an amplifier output current is reflected by the reflecting surface formed on the interior surface of the header cover window into the P-I-N diode to generate an appropriate feedback photo-current.

Thus, an integrated package for providing an optical feedback path for a receiver has been provided.

DETAILED DESCRIPTION OF THE INVENTION

Figure 1:
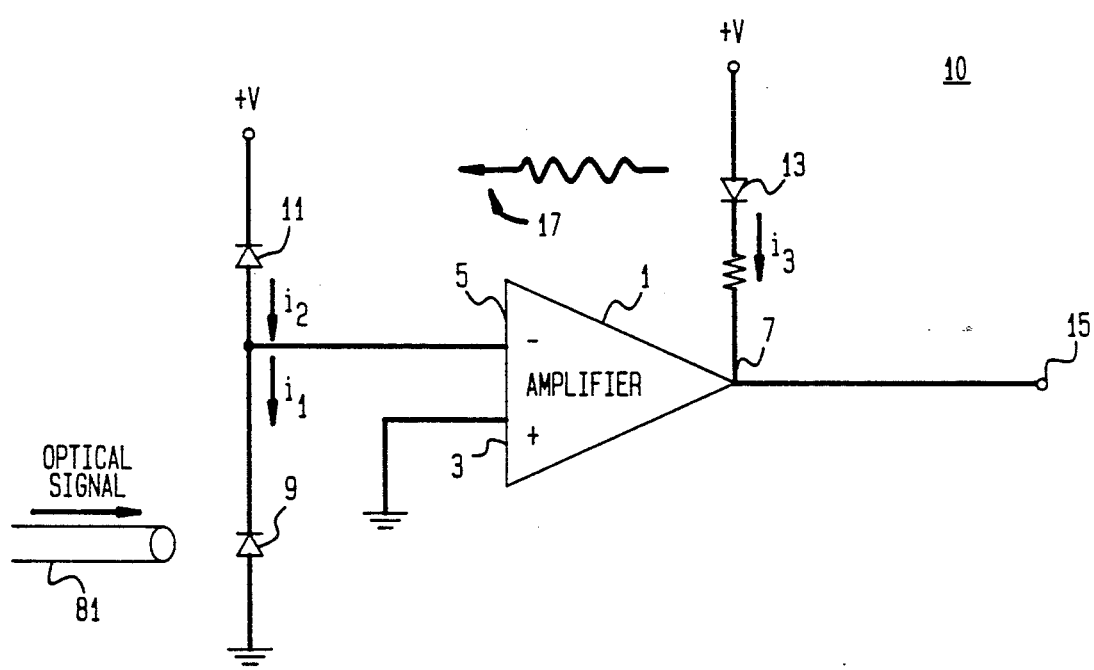
FIG. 1 schematically illustrates an optical receiver including an optical feedback path.

An optical receiver 10 including an optical feedback path is illustrated in FIG. 1. The receiver 10 comprises an amplifier 1. The amplifier 1 has a non-inverting input terminal 5, an inverting input terminal 3 and an output terminal 7. The inverting terminal 3 is grounded. Connected to the non-inverting terminal 5 are two photodetectors 9 and 11. Illustratively, the photodetectors 9 and 11 are P-I-N diodes. The photodetectors 9 and 11 are reverse biased as the cathode of the photodetector 11 is connected to a positive voltage source +V and the anode of the photodetector 9 is connected to ground. An optical signal to be detected by the receiver 10 is transmitted via the optical fiber 81 and is incident on the photodetector 9. Connected to the output terminal 7 of the amplifier 1 through series resistance R is light source 13. This light source is illustratively a light emitting diode having a P-N structure. The light emitting diode 13 is forward biased. The output signal of the receiver is taken at terminal 15. The series resistance R is utilized to convert the current signal i3 at the output terminal 7 of the amplifier into a proportional voltage. The light intensity output of the light source 13 is proportional to the current i3.

There is an optical feedback path 17 between the light source 13 and photodetector 11. The feedback path 17, which optically couples the elements 13 and 11 may be free space or it may comprise an optical wave guide. Also, use of a lens or integrated optics is contemplated.

The receiver 10 operates as follows. The photodetector 9 generates a current i1 in response to an optical signal received via the fiber 81. Negative feedback via the optical path 17 insures that the optical signal level at the feedback photodetector 11 is large enough so that the current i2 produced by the feedback photodetector 11 balances the current i1 produced by the signal photodetector 9.

It should be noted that the optical wavelength used for transmission via the feedback path 17 does not have to be the same as the wavelength used for transmission of the signal via the optical fiber 81. It should also be noted that the receiver 10 need not be an optical receiver at all, but may instead serve as a receiver for a signal in electrical form. Illustratively, the optical fiber 81 and signal photodetector 9 can in this case be replaced in the receiver 10 by another type of source for the current i1, which current i1 can then be balanced by the current i2 generated as a result of optical feedback.

Figure 2:
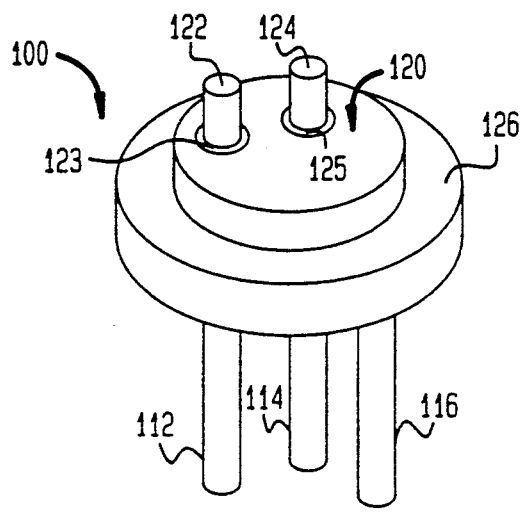
FIG. 2 illustrates the base of a header.
Figure 3:
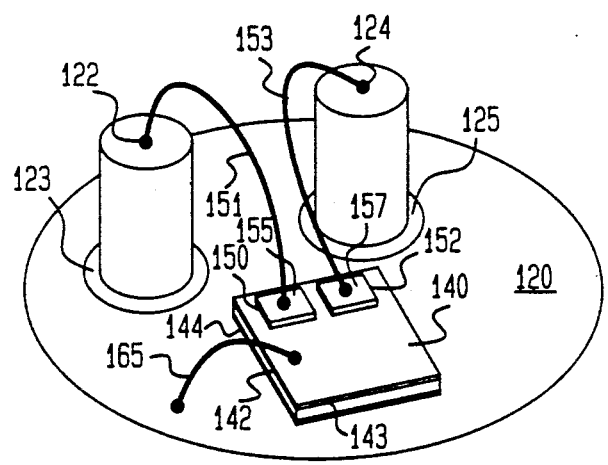
FIG. 3 illustrates the bonding of an LED and P-I-N diode to a common submount on the base of a header, in accordance with an illustrative embodiment of the present invention.
Figure 4:
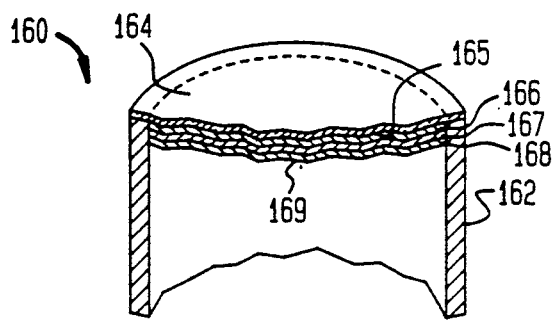
FIG. 4 illustrates a unique header cover which causes light emitted by the LED to be detected by the P-I-N diode.

FIGS. 2, 3, and 4 illustrate an arrangement for forming an optical feedback path for a receiver. In particular, FIGS. 2, 3, and 4 illustrate a device which integrates a light emitting diode and a P-I-N diode into a single header.

FIG. 2 illustrates a perspective view of the base 100 of a header. Preferably, the header is a TO-46 base. The base 100 is formed from gold plated Kovar and is circular in shape. Associated with the base 100 are three leads 112, 114, 116. The lead 116 is connected to the base 100 itself. The leads 112 and 114 pass through the base 100 by way of corresponding openings formed therein. The leads 112 and 114 are insulated from the base 100 as the portions of the leads 112 and 114 which pass through the base 100 are surrounded by electrically insulating rings 123 and 125 which may be formed from glass. The leads 112 and 114 penetrate the major surface 120 of the base 100 and form the posts 122 and 124.

As is described below in connection with FIG. 3, the active devices (e.g. LED and P-I-N diode) are mounted on the circularly shaped major surface 120 of the base 100 through use of a submount. The base 100 also includes the shoulder 126 for receiving the cylindrically shaped cover 160 illustrated in cross-sectional form in FIG. 4.

A top view of the major surface 120 of the base 100 is illustrated in FIG. 3. The posts 122 and 124 are shown as intersecting the surface 120 and extending upward beyond the surface 120. The portions of the posts 122 and 124 which pass through the base 100 are surrounded by the insulating rings 123 and 125.

A submount 140 is solder-bonded to the major surface 120 of the base 100. The submount 140 comprises a block 142 of insulating material such as BeO with layers 143 and 144 of gold formed on the top and bottom surfaces of the BeO block 142.

Solder-bonded to the top surface layer 143 of the submount 140 is an LED 150 and a P-I-N diode 152. The LED 150 is wire bonded via the wire 151 to the post 122 and the P-I-N diode 152 is wire-bonded via the wire 153 to the post 124. The top conducting layer 143 of the submount 140 is wire-bonded to the major surface 120 of the base 100 via wire 165.

When the LED is forward biased, it emits light. The P-I-N diode serves as a photodetector. Illustratively, the P-I-N diode may be reverse biased. Reverse biasing decreases the P-I-N diode capacitance, thereby increasing circuit speed. The P-I-N diode should be chosen so that it detects optical radiation at the wavelength emitted by the LED. Preferably the LED 150 is a surface emitter and emits radiation through its top surface 155. Similarly, the P-I-N diode 152 is a surface detector which detects radiation incident on the surface 157.

To use the LED 150 and P-I-N diode 152 to provide a feedback path for a receiver, there should be an optical path between the LED 150 and P-I-N diode 152. This optical path is provided by the cover 160 illustrated in cross-sectional form in FIG. 4.

The cover 160 is generally cylindrical in shape and is dimensioned to sit on the shoulder 126 of the base 100 (see FIG. 2). In a conventional header, the cover 160 comprises a gold cylindrical portion 162 with a glass top 164. Alternatively, an all metal cap can be utilized.

In order to provide an optical path between the LED 150 and P-I-N diode 152, the underside 165 of the glass window 164 is metallized with Ti to form a Ti layer 166. The Ti layer 166 is then plated with a Pt layer 167. The Pt layer is then plated with a gold layer 168 to form a reflecting surface 169 for reflecting light emitted by the LED 150 onto the P-I-N diode 152.

To use the inventive structure of FIGS. 2 3, and 4 in the receiver 100 of FIG. 1, the lead 116 which is connected to the base 100 is connected to the electrical potential +V. The lead 112 which is in communication with the LED 150 is connected to the resistor R of FIG. 1 so as to forward bias the LED in response to an output voltage of the amplifier 1. The lead 114 which is in communication with the P-I-N diode 152 is connected to the input 5 of the amplifier 1.

Finally, the above-described embodiments or the invention are intended to be illustrative only. Numerous alternative embodiments may be devised by those skilled in the art without departing from the spirit and scope of the following claims.

I claim:

1. A device for providing an optical feedback path for a receiver comprising:
   a header comprising a base having a major surface and first, second, and third leads, said first and second leads extending through said base to form first and second posts on said major surface and said third lead being electrically connected to said base,
   a submount solder-bonded to said major surface of said base and having a conducting upper major surface electrically connected to said base,
   an LED solder-bonded to said upper major surface of said submount and wire bonded to said first post, said LED emitting optical radiation when it is forward biased,
   a P-I-N diode solder-mounted to said upper major surface of said submount and wire bonded to said second post, said P-I-N diode detecting said optical radiation emitted by said LED, and
   a cover for said header having a reflective top inner surface for providing a reflective optical path between said LED and said P-I-N diode.

2. The device of claim 1 wherein said base comprises gold plated Kovar.

3. The device of claim 1 wherein said submount comprises a block of insulating material and a first layer of gold on a lower major surface of said block and a second layer of gold on an upper major surface of said block.

4. The device of claim 3 wherein said second gold layer of said submount is wire-bonded to said major surface of said base.

5. The device of claim 1 wherein said LED is a surface emitter.

6. The device of claim 5 wherein said P-I-N diode is sensitive to optical radiation emitted by said LED, reflected off the top inner surface of said cover, and incident on a major surface of the P-I-N diode.

7. The device of claim 1 wherein said cover comprises a tubular section, a glass window at an end of the tubular section, and a reflecting metal surface formed on the inner surface of the glass window.

8. A device for providing an optical feedback path for a receiver comprising:
   a header comprising a base having a major surface and first, second, and third leads, said first and second leads being electrically insulated from said base and said third lead being electrically connected to said base,
   an LED mounted on said base and electrically connected to said first lead, said LED emitting optical radiation when it is forward biased,
   a diode mounted on said base and electrically connected to said second lead, said diode detecting said optical radiation emitted by said LED,
   a cover for said header having a reflective top inner surface for providing an optical path between said LED and said diode.

9. A receiver comprising:
   an amplifier having an input and an output,
   a signal receiving means connected to said input, and
   feedback means for optically coupling said input and said output, said feedback means comprising;
   a header comprising a base having a major surface and first, second, and third leads, said first and second leads being electrically insulated from said base and said third lead being electrically connected to said base,
   a light emitting device mounted on said base and electrically connected by said first lead and a resistor to said output of said amplifier,
   a light detecting device mounted on said base and electrically connected by said second lead to said input of said amplifier, and
   a cover for said header having a reflective inner surface for providing an optical path between said light emitting device and said light detecting device.

10. The receiver of claim 9 wherein said light emitting device and said light detecting device are mounted on said base by way of a submount.

* * * * *